United States Patent
Hummel et al.

(10) Patent No.: US 9,224,509 B2
(45) Date of Patent: Dec. 29, 2015

(54) CONTAINER, DEVICE AND METHOD FOR ENCAPSULATING A FUEL ROD OR A FUEL ROD PORTION IN A GAS-TIGHT MANNER

(71) Applicant: AREVA GMBH, Erlangen (DE)

(72) Inventors: Wolfgang Hummel, Neumarkt (DE); Egon Neubauer, Forchheim (DE)

(73) Assignee: Areva GmbH, Erlangen (DE)

( * ) Notice: Subject to any disclaimer, the term of this patent is extended or adjusted under 35 U.S.C. 154(b) by 200 days.

(21) Appl. No.: 14/444,019

(22) Filed: Jul. 28, 2014

(65) Prior Publication Data

US 2014/0364673 A1    Dec. 11, 2014

Related U.S. Application Data

(63) Continuation of application No. PCT/EP2013/050558, filed on Jan. 14, 2013.

(30) Foreign Application Priority Data

Jan. 26, 2012 (DE) .......................... 10 2012 201 131
Mar. 2, 2012 (DE) .......................... 10 2012 203 347
Jun. 20, 2012 (DE) .......................... 10 2012 210 409

(51) Int. Cl.
| | | |
|---|---|---|
| *G21F 1/00* | (2006.01) | |
| *G21F 5/008* | (2006.01) | |
| *G21C 19/26* | (2006.01) | |
| *G21F 5/12* | (2006.01) | |

(52) U.S. Cl.
CPC ................ *G21F 5/008* (2013.01); *G21C 19/26* (2013.01); *G21F 5/12* (2013.01)

(58) Field of Classification Search
CPC .................................. C01C 1/242; G21F 1/00
USPC .......... 423/549, 235, 237, 238, 239.1; 588/16
See application file for complete search history.

(56) References Cited

U.S. PATENT DOCUMENTS

| 4,197,467 A | 4/1980 | Williams |
|---|---|---|
| 2007/0104305 A1 | 5/2007 | Veron |

FOREIGN PATENT DOCUMENTS

| DE | 1450318 A1 | 1/1969 |
|---|---|---|
| DE | 2854358 A1 | 6/1979 |
| DE | 19640393 A1 | 4/1998 |
| DE | 102010036373 B3 | 1/2012 |
| EP | 1248270 A1 | 10/2002 |
| EP | 1600982 A2 | 11/2005 |
| EP | 2418652 B1 | 10/2013 |
| GB | 1070204 A | 6/1967 |
| WO | 2010084122 A1 | 7/2010 |

*Primary Examiner* — Edward Johnson
(74) *Attorney, Agent, or Firm* — Laurence Greenberg; Werner Stemer; Ralph Locher

(57) ABSTRACT

A container, a device, and a method encapsulate a fuel rod or a fuel rod portion in a gas-tight manner. The container has a hollow cylindrical container part which is closed at the free ends of the container part in a fluid-tight manner by a respective single-piece closure stopper. The closure stopper is provided with a channel that fluidically connects the flushing chamber of the container part to the exterior exclusively in an intermediate position, which is assumed prior to reaching an end position during the assembly process and in which the closure stopper additionally projects out of the container part by an axial length compared to the end position of the closure stopper.

23 Claims, 8 Drawing Sheets

CONTAINER, DEVICE AND METHOD FOR ENCAPSULATING A FUEL ROD OR A FUEL ROD PORTION IN A GAS-TIGHT MANNER

CROSS-REFERENCE TO RELATED APPLICATION

This is a continuation application, under 35 U.S.C. §120, of copending international application No. PCT/EP2013/050558, filed Jan. 14, 2013, which designated the United States; this application also claims the priority, under 35 U.S.C. §119, of German patent applications DE 10 2012 201 131.5 filed Jan. 26, 2012, DE 10 2012 203 347.5 filed Mar. 2, 2012, and DE 10 2012 210 409.7 filed Jun. 20, 2012; the prior applications are herewith incorporated by reference in their entireties.

BACKGROUND OF THE INVENTION

Field of the Invention

The invention relates to a container, a device and a method for the gas-tight encapsulation of a fuel rod or of a fuel rod section.

For transportation and/or storage purposes, defective fuel rods or fuel rod sections are inserted in a vacuum-tight and a fluid-tight fashion into containers or capsules such as are known for example from German patent DE 196 40 393 B4, from European patent application EP 1 248 270 A1, from European patent EP 1 600 982 B1, and from international patent disclosure WO 2010/084122 A1. Since the encapsulation of a fuel rod or of a fuel rod section is performed as close as possible to the original storage location, that is to say underwater within the fuel element storage basin, it is inevitable that water infiltrates into the open container during the insertion of the fuel rod or fuel rod section. The water must however be removed from the fuel rod container because, owing to decay heat, the water would evaporate and lead to an inadmissibly high internal pressure. For this reason, the closure elements used in the containers known from German patent DE 196 40 393 B4, from European patent application EP 1 248 270 A1 and from European patent EP 1 600 982 B1 have a duct via which gas can be injected such that the water situated in the container is expelled. In the case of the closure plugs known in each case from German patent DE 196 40 393 B4 and from European patent application EP 1 248 270 A1, a coaxial duct is provided in each closure plug, in which coaxial duct there is arranged a spring-loaded valve which, by way of a closing element, closes off the duct in fluid-tight fashion. For the expulsion of the water, the closing elements are raised from their valve seat by a ram, and via a duct that is then opened, a gas is injected and the water is expelled via the likewise open duct of the oppositely situated closure element. In the case of the two known containers, the expulsion of the water takes place when the closure elements are, as a result of a screwing, welding or deformation process, situated in their final assembled position in which they close off the container in a fluid-tight fashion.

In the container known from European patent EP 1 600 982 B1, a closure element is provided which can be screwed onto an external thread of the container and in which a seal element is mounted in axially displaceable fashion. In an intermediate position of the closure element, in which the closure element is not yet fully tightened, a parting joint exists between the sealing surface of the sealing element and the face surface, which interacts with the sealing surface to form a sealing pairing, of the hollow cylindrical container part, which parting joint communicates with a lateral ventilation opening in the closure element and, in the intermediate position, fluidically connects the exterior to the scavenging chamber of the hollow cylindrical container part.

In order, in the case of the closure elements known from German patent DE 196 40 393 B4, from European patent application EP 1 248 270 A1 and from European patent EP 1 600 982 B1, to permit both an expulsion of the water situated in the container and also, in a final assembled state, reliable fluid-tight closure of the container, the closure elements are of multi-part and relatively complex construction. Furthermore, the handling thereof involves a correspondingly high level of manipulation effort.

In the case of the container known from international patent disclosure WO 2010/084122 A1, there is provided as a closure element a cap which is pushed onto a hollow cylindrical container part and connected to the face surface thereof in cohesive fashion. The closure of the container is performed in a fluid-tight chamber. Before the closure, that is to say when the cap has not been mounted onto the hollow cylindrical container part, the liquid situated in the chamber is drawn out, and a vacuum-drying process is subsequently performed. Owing to the fact that, within the container equipped with a fuel rod, narrow gaps are present between the fuel rod and the internal wall of the container, it is in some circumstances possible for residual water to remain in the container.

SUMMARY OF THE INVENTION

The invention is therefore based on the problem of specifying a container for the gas-tight encapsulation of a fuel rod or of a fuel rod section, the closure element of which container is of simple construction and permits a simple and reliable fluid-tight, that is to say gas-tight and liquid-tight, closure of the container. The invention is furthermore based on the object of specifying a device and a method by which a container containing a fuel rod or fuel rod section can be closed with the least possible residual water content.

Accordingly, the container has a hollow cylindrical container part which, at its two free ends, is closed off in fluid-tight fashion by a respective unipartite closure plug. The closure plug is provided with a duct which fluidically connects the scavenging chamber of the container part to the exterior exclusively in an intermediate position which is assumed during the assembly process before an end position is reached and in which the closure plug projects out of the container part by an axial projecting length.

Since the closure plug is of unipartite form, the closure plug can be of technically very simple form and produced with little outlay. Since, furthermore, the duct situated in the closure plug fluidically connects the scavenging chamber of the container part to the exterior only when the closure plug is situated in an intermediate position, no additional closing elements are required within the duct, such that the duct, too, can be manufactured in a simple manner by way of bores or recesses.

Within the context of the present invention, the expression "closure plug" should be understood to mean that, for the insertion of the closure plug into the hollow cylindrical container part, only a "plugging" action is required, that is to say a pushing-in action in the axial direction and no rotational movement.

The intermediate position is a position in which the closure plug has already been pushed into the hollow cylindrical container part but has not yet reached the end position in which it closes off the hollow cylindrical container part in fluid-tight fashion by a cohesive or form locking connection.

In one advantageous embodiment of the invention, the duct has a first duct section which runs parallel to the longitudinal axis of the closure plug from an inner face side of the closure plug and which issues into a second duct section, the latter running transversely with respect to the longitudinal axis and extending from a shell surface of the closure plug. A duct of this type can be produced in a simple manner by way of bores in a longitudinal or transverse direction respectively.

To hold the closure plug securely in the intermediate position, detent devices are provided on the closure plug and/or hollow cylindrical container part on the outer circumference and/or on the inner circumference respectively, which detent devices detachably fix the closure plug in the intermediate position.

If the closure plug, in the fully assembled position, is seated by way of an annularly encircling flange on a face surface of the hollow cylindrical container part, it is possible for the closure plug and hollow cylindrical container part to be connected to one another in a fluid-tight fashion, in a simple manner from a manufacturing aspect, by an annularly encircling weld seam or brazed seam between the flange and the face surface.

As an alternative to a cohesive connection of this type, the closure plug may also be fixed in a fluid-tight fashion in the hollow cylindrical container part by a shrink-fit connection.

With regard to the device, the device has a first and a second processing chamber, the processing chambers being arranged spaced apart from one another on a common system axis. The first and second processing chambers are furthermore provided with a first and second opening, respectively, for receiving a free end, which issues into the processing chamber, of the container, such that the first and second processing chambers, when a container is arranged between them, can be fluidically connected to one another exclusively via the container itself. The first processing chamber has an inlet and the second processing chamber has an outlet for a scavenging gas, wherein each processing chamber has means for closing the container in gas-tight fashion.

Since the first and second processing chambers, when a container is arranged between the processing chambers, can be fluidically connected to one another exclusively via the container itself, it is sufficient for scavenging gas to be injected exclusively into the first processing chamber, which scavenging gas is then inevitably forced through the hollow cylindrical container part via openings situated in the closure plug, and passes exclusively through the container part into the second processing chamber. As a result, the water situated in the container part is reliably expelled. It is thus not necessary for a scavenging gas line to be connected directly to a duct arranged in the closure plug.

In one advantageous embodiment of the device, the processing chambers are arranged so as to be displaceable along the system axis. In this way, the container can be arranged between the processing chambers. By displacement of the processing chambers, the free ends of the container are guided through the openings so as to project into the processing chambers.

In a particularly advantageous embodiment of the invention, each processing chamber is provided with a pressure ram which annularly surrounds the opening and which can be advanced in the direction of the system axis toward the opening and by which, by way of an advancing movement in the direction of the system axis, a force with a component acting transversely with respect thereto is exerted on a sealing ring which is arranged on the opening and which surrounds the opening. By means of this measure, the container can in a simple manner be connected in a fluid-tight fashion to the respective processing chamber by use of the opening, such that the processing chambers are mechanically connected to one another exclusively by the container.

In an alternative embodiment of the device, the first and second processing chambers are rigidly connected to one another along the system axis by a connecting pipe which projects by way of its face-side ends into the first and second processing chambers. The container can be inserted into the connecting pipe such that the container projects by way of its free ends beyond the connecting pipe. The construction of the device is simplified by means of this measure because the processing chambers no longer need to be mounted so as to be displaceable relative to one another.

In a further advantageous embodiment, the inlet and outlet are formed by an inlet pipe and an outlet pipe respectively, which issue into the first and second processing chambers respectively and the central axes of which coincide with the system axis and between which the connecting pipe is arranged in each case with an axial spacing, such that, between the face sides facing toward one another, there remain a first and a second free space respectively. Here, the connecting pipe can be connected in a fluid-tight fashion to the inlet pipe and to the outlet pipe by a first and second sleeve, respectively, which is arranged so as to be axially displaceable into a first position, wherein the first and second sleeves are displaceable into a second position in which the first and second free spaces are open to the first and second processing chambers respectively. In this embodiment, it is no longer necessary for the scavenging gas to be conducted through the processing chambers because, in the latter, a fluid-tight duct that serves as a scavenging chamber is created by the inlet and outlet pipe and the connecting pipe, such that, during the insertion of the container into the device, which takes place under water, no water can infiltrate into a working chamber of the processing chamber, which working chamber is situated outside the scavenging chamber and in which working chamber the tools required for the fluid-tight closure of the container are situated.

It is preferable for a sealing element to be arranged between the container and connecting pipe, which sealing element can be set such that the inlet pipe and outlet pipe are fluidically connected to one another exclusively via the container.

In order, in addition to the expulsion of the water from the container by the scavenging gas that is forced in, to also remove any water that has infiltrated into a defective, non-sealed fuel rod or into fuel rod sections and thus into the fuel matrix, it is provided in one advantageous embodiment of the device that the inlet and outlet can be connected to one another, via a bypass line that runs outside the processing chambers, in such a way that a closed gas circuit is formed, wherein, in the gas circuit, there are arranged a pump and a heating device for respectively circulating and heating a heating gas situated in the gas circuit. In this way, the water bound in the fuel matrix can be evaporated, and the fuel matrix dried.

If each processing chamber has a pressure ram for exerting a pressure force that acts in the direction of the system axis, the closure plug of a container can be pushed into the hollow cylindrical container part in a particularly simple manner.

If each processing chamber has a welding head which is mounted such that it can be rotated about, and advanced toward, the system axis, the closure plug can be welded to the hollow cylindrical container part without it being necessary for the container part to be set in rotational motion for this purpose.

Furthermore, if each processing chamber contains a cleaning brush which is mounted such that it can be rotated about, and advanced toward, the system axis, the parts to be welded can be cleaned in situ before the welding process, and the quality of the weld seam can thus be improved.

The outlay in terms of construction is furthermore reduced if the welding head and cleaning brush are arranged on a common rotary ring.

With regard to the method, the object of the invention is achieved by a method using the device according to the invention and the container according to the invention. The method includes the following method steps:

a) introducing a free end of the container part, which is equipped with the closure plug in the intermediate position and which contains the fuel rod or the fuel rod section, through the first opening into the first processing chamber, and introducing the opposite free end through the second opening into the second processing chamber, such that the first and second processing chambers are fluidically connected to one another exclusively via the container part itself; and b) injecting a scavenging gas into the first processing chamber, and expelling the water situated in the container part and in the processing chambers that are fluidically connected to one another via the container part, through the build-up of a positive pressure.

In a particularly advantageous embodiment of the invention, after the expulsion of the water, heating gas is pumped through the container part, in order thereby to additionally reduce the water content in the container part by evaporation of the water. In other words: no vacuum drying takes place. If the heating gas is furthermore circulated in a closed gas circuit until a final value is attained at which the moisture content increases no further, it is possible from the moisture content to determine the absolute amount of water, which is gaseous during recirculation of the heating gas, situated within the container, such that precise statements can be made regarding the remaining water content in the container after the closure of the container.

The closure plug is subsequently pressed into the container part as far as the end position and is connected in fluid-tight fashion to the container part.

The closure plug is preferably cohesively connected to the container part by an annularly encircling weld seam or brazed seam, or is alternatively fixed in fluid-tight fashion in the container part by a shrink-fit connection.

Other features which are considered as characteristic for the invention are set forth in the appended claims.

Although the invention is illustrated and described herein as embodied in a container, a device and a method for encapsulating a fuel rod or a fuel rod portion in a gas-tight manner, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
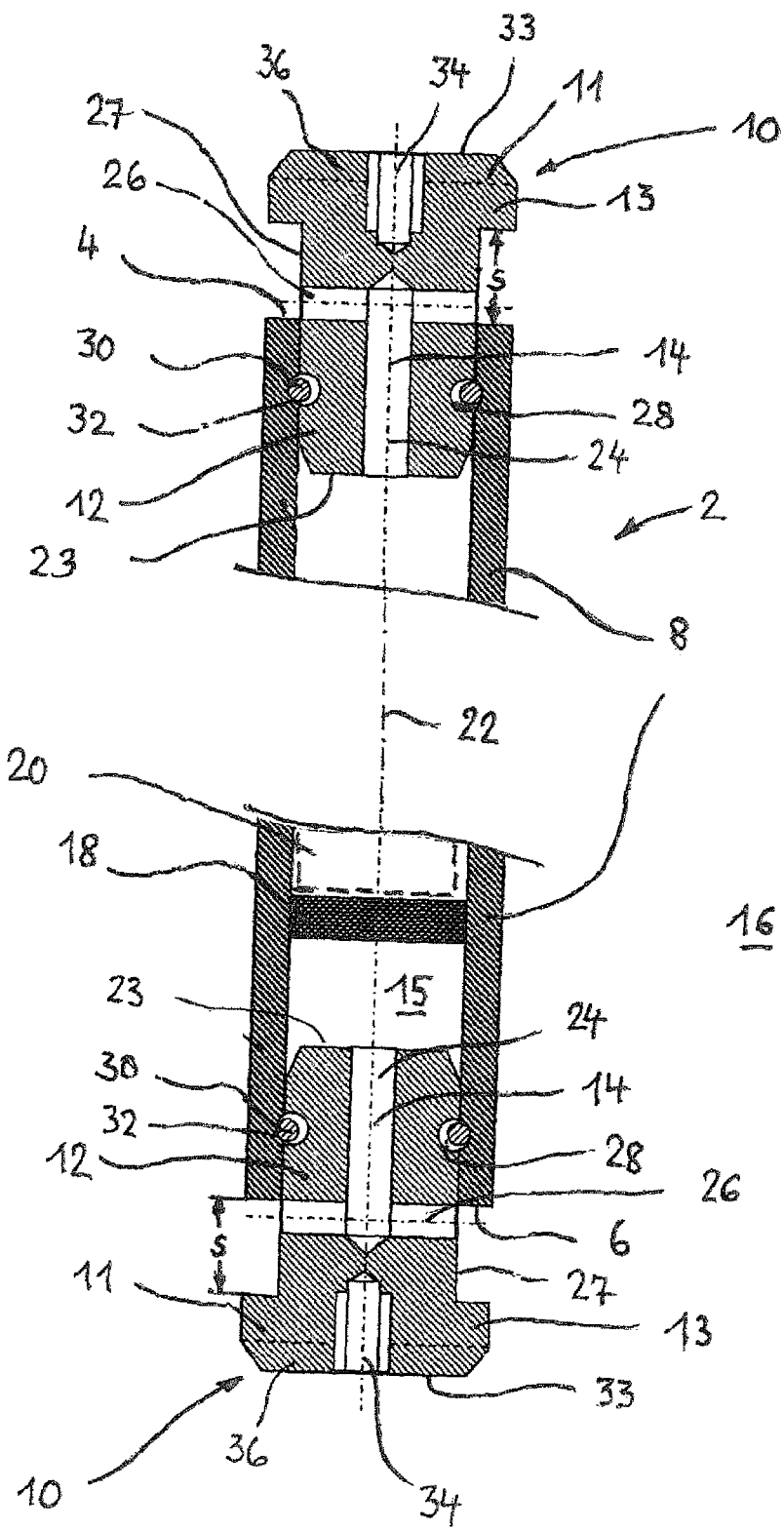
FIG. 1 is a diagrammatic, longitudinal sectional view of a container according to the invention with a closure plug pre-mounted in an intermediate position.

Referring now to the figures of the drawings in detail and first, particularly to FIG. 1 thereof, there is shown a container 2 having a hollow cylindrical container part 8 which is open at its face or end sides 4 and 6. At the face sides 4, 6, a respective unipartite closure plug 10 has been partially pushed in as far as an intermediate position. Each closure plug 10 has a head part 11 and a cylindrical shank 12, the outer diameter of which is only slightly smaller than the inner diameter of the container part 8. The head part 11 has an annularly encircling flange 13, an outer diameter of which corresponds to the outer diameter of the container part 8. In the intermediate position, the closure plug 10 projects beyond the hollow cylindrical part 8 by an additional projecting length s in relation to the end position of the closure plug 10, such that a part of the shank 12 situated below the head part 11 is situated outside the container part 8.

Each closure plug 10 is provided with a duct 14 which, in an intermediate position, fluidically connects an interior 15 to the exterior 16.

A sintered metallic filter element 18 is arranged in the cylindrical container part 8 at that free end which is situated at the bottom during handling, which filter element 18 prevents coarse particles from being able to escape from the still-open container 2 after the container has been equipped with a fuel rod 20 or fuel rod section indicated by dashed lines in FIG. 1. If it is the intention to encapsulate a defective fuel rod 20 into which water has infiltrated, the fuel rod has previously been opened in the region of its two end plugs, and the gaseous radioactive fission products contained therein, which escape through the openings, have been discharged in a targeted fashion.

The duct 14 which, in the intermediate position, is fluidically connected to the exterior 16 is formed, in the example, by a central first duct section 24, which runs along a longitudinal central axis 22 and extends from a face side 23 facing toward an interior 15 and which is in the form of a blind bore, and by at least one second duct section 26, a through bore in the example, which runs perpendicular to the first duct section 24, wherein the first duct section 24 issues into the second duct section 26. The location or locations at which the second duct section(s) 26 intersect(s) a shell surface 27 of the closure plug 10, that is to say the issuing openings of the one or more second duct sections 26, is/are arranged in that region of the shank 12 of the closure plug 10 which is situated outside the container part 8 when the closure plug 10 is in the intermediate position.

The shank 12 of the closure plug 10 is equipped, between its face side 23 that projects into the container part 8 and the one or more issuing openings, with an annular recess or groove 28 which serves for receiving a securing ring 30. The hollow cylindrical container part 8 is likewise equipped, on its inner surface in the region of the free ends, with a respective annularly encircling turned-in portion 32 into which the securing ring 30 inserted into the groove 28 engages with detent action when the closure plug 10 is inserted into the hollow cylindrical container part 8. The securing ring 30 and groove 28 accordingly serve as detent devices that detachably fix the closure plug 10 in the intermediate position.

At its face side 33 facing away from the hollow cylindrical container part 8, the closure plug 10 is provided with a threaded bore 34 which serves for the screwed engagement of a bar-type tool that is used for handling the closure plug 10. A groove 36 (indicated by dashed lines) that runs perpendicular to the threaded bore 34 serves as a torque support as a bar-type tool (not illustrated in the figure) is screwed into the threaded bore 34.

Figure 2:
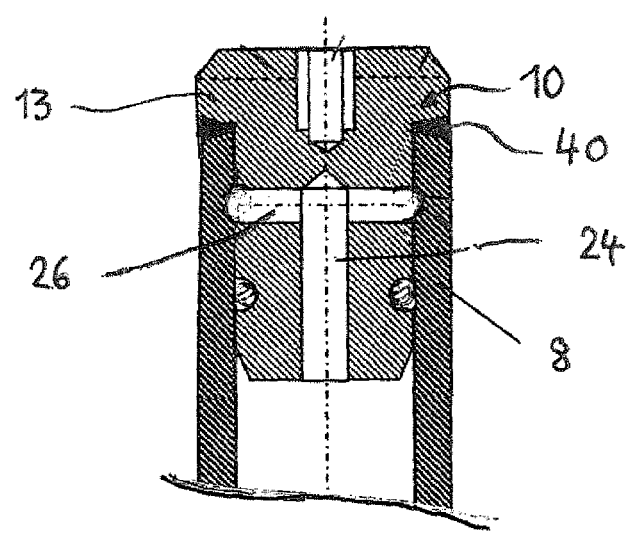
FIG. 2 is a detailed, sectional view of the container that is closed off with the closure plug along an annular weld seam.

FIG. 2 shows the container 2 with the upper closure plug 10 in an end position in which it has been pushed deeper into the container part 8, by the distance s, until the flange 13 has set down by way of its sealing surface on the face surface of the hollow cylindrical container part 8 and the issuing openings of the one or more second duct sections 26 are situated within the container part 8. In the end position, the flange 13 is welded to the face sides 4 of the container part 8 along an annularly encircling weld seam 40, such that the closure plug 10 closes off the container part 8 in fluid-tight fashion.

Figure 3A:
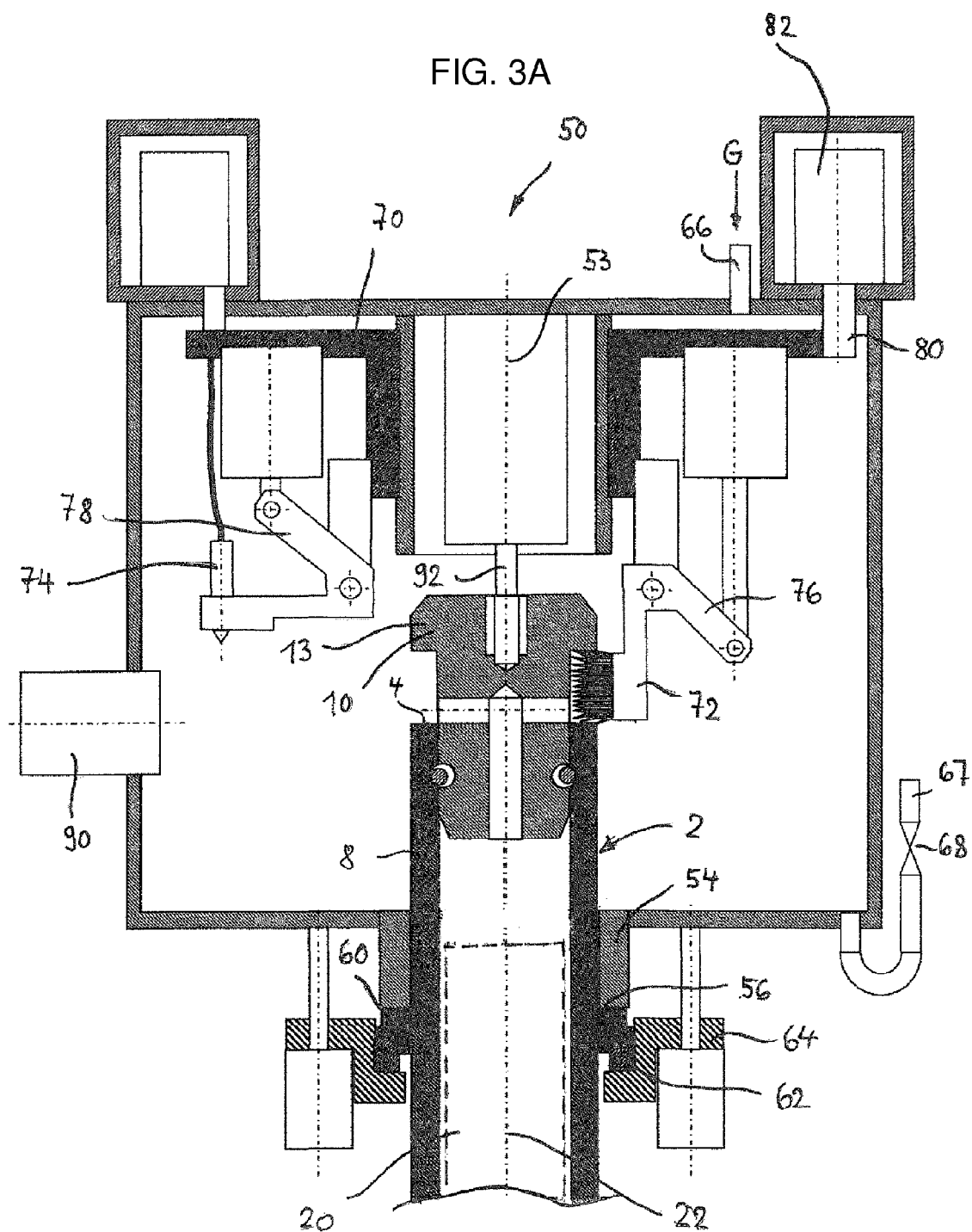
FIGS. 3A and 3B are diagrammatic, partial, longitudinal section views showing in each case mutually opposite processing chambers of a device according to the invention, with the container mounted in a working position, during the expulsion of water.
Figure 3B:
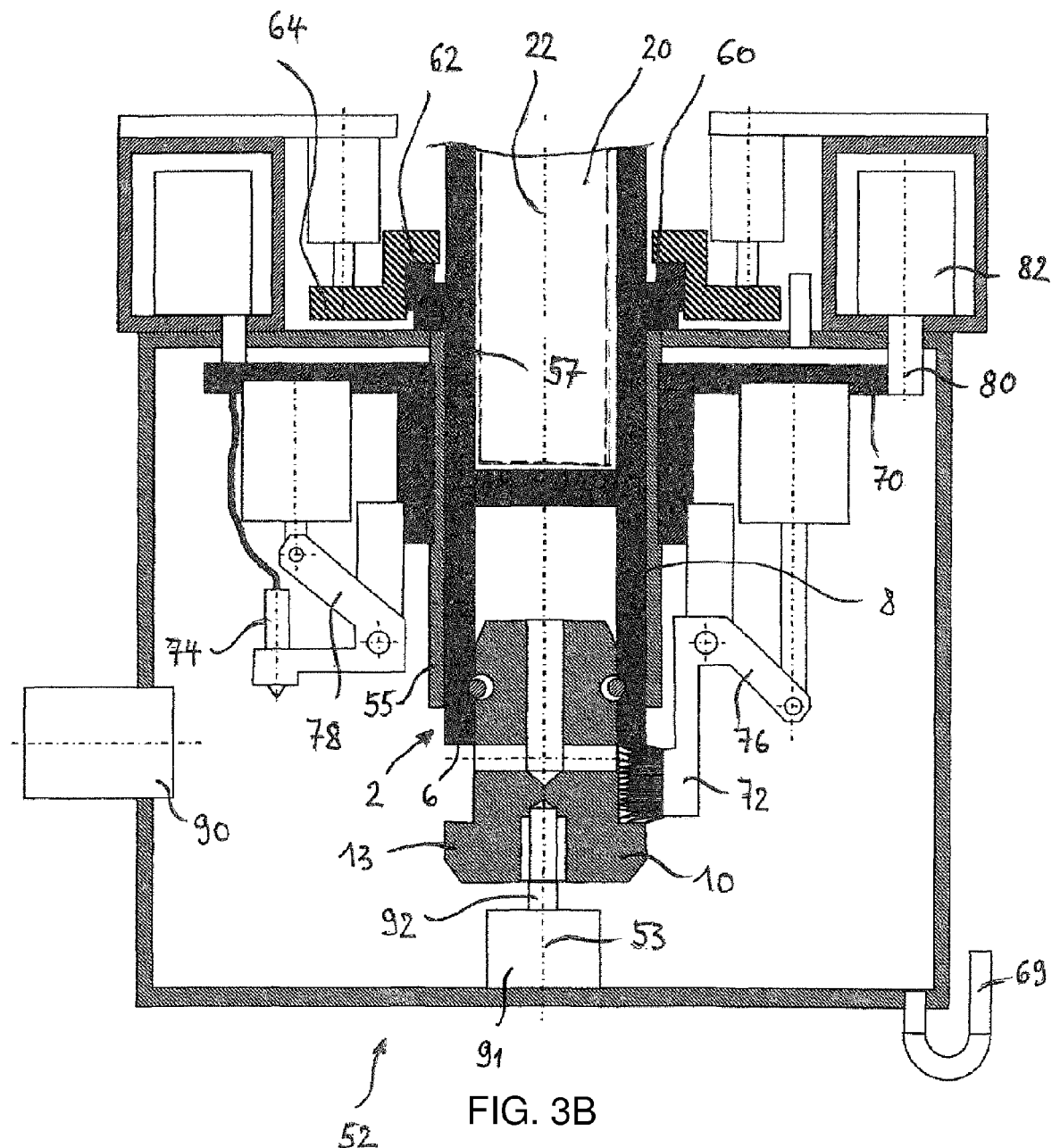

As per FIGS. 3A, 3B, a device for closing off the container 2 illustrated in FIG. 1 in a gas-tight fashion at both sides contains a first (upper) processing chamber 50 (FIG. 3A) and a second (lower) processing chamber 52 (FIG. 3B). The first and second processing chambers 50, 52 are spaced apart from one another and are arranged such that they can be positioned on a common, vertically oriented system axis 53 and such that they can be displaced relative to one another along the system axis 53. The first and second processing chambers 50, 52 are provided with first and second insertion openings 56, 57 which face toward one another and which are formed by first and second guide sleeves 54, 55 and which are arranged opposite one another in the direction of the system axis 53 and through which the container part 8 equipped with the fuel rod 20 or a fuel rod section is, by way of its face-side free ends and the closure plugs 10 pre-mounted there in the intermediate position, inserted and oriented such that the longitudinal central axis 22 of the container part 8 and the system axis 53 of the device coincide.

After the face-side ends of the container part 8 equipped with the pre-mounted closure plug 10 have been inserted through the insertion openings 56, 57, the first and second processing chambers 50, 52 are closed off in fluid-tight fashion in the region of the insertion openings 56, 57 by virtue of a sealing ring 60 which annularly surrounds the container 2 being subjected, by virtue of an annular pressure ram 64 likewise equipped with an elastic sealing ring 62 being advanced axially in the direction of the system axis 53, to a force with a component acting perpendicular to the system axis 53, such that the sealing ring 60 is pressed against the outer circumference of the container part 8 and against the inner edge of the insertion opening 56, 57, thus closing a gap situated between the container part 8 and the insertion opening 56 and 57 respectively. In the assembled position, in which the closure plugs are still situated in the intermediate position, the first and second processing chambers 50, 52 are fluidically connected to one another exclusively via the container part 8.

The first processing chamber 50 has an inlet 66 via which scavenging gas G, for example argon Ar, can be injected at high pressure. At its bottom side, the first processing chamber 50 is provided with an outlet 67 which has a valve 68 which is closed for the purpose of building up an internal pressure. The second processing chamber 52 is provided, on its bottom side, with a siphon which serves as an outlet 69 for the scavenging gas G.

In each processing chamber 50, 52, a rotary ring 70 is mounted so as to be rotatable about the system axis 53, on which rotary ring a cleaning brush 72 and a welding head 74 are mounted, such that they can be advanced toward the system axis 53, by use of a respective rocker arm 76 and 78. The rotary ring 70 is driven, via a pinion 80, by an encapsulated motor 82. An observation camera 90 makes it possible to monitor the work operations to be performed for the closure of the container.

In each of the first and second processing chambers 50 and 52, opposite the opening 54 or 56 respectively, there is arranged a pressure ram 92 actuated by a stroke-action cylinder 91, by which pressure ram the closure plug 10 can be subjected to a pressure force acting in the direction of the system axis 53.

After insertion of the container part 8 equipped with the closure plug 10 in the intermediate position into the first and second processing chambers 50, 52 as far as a stop formed in each case by the pressure ram 92, the openings 56 and 57 are closed off. Subsequently, with a valve 68 open, the scavenging gas G is introduced at high pressure into the first processing chamber 50. The first processing chamber 50 is brought into a dry state in this way. After the closure of the valve 68, the scavenging gas G then flows through the container part 8 equipped with the closure plugs 10 in the intermediate position and expels, via the outlet 69, water situated in the container part 8 and in the second processing chamber 52. If gas bubbles rise from the outlet 69, this is an indication that the first and second processing chambers 50, 52 and the container part 8 no longer contain water. If a valve is installed in the outlet 69, it is possible, after the closure of the valve, for the supply of scavenging gas G to be stopped and for the positive pressure prevailing in the processing chambers 50, 52 to be dissipated.

The cleaning brushes 72 are subsequently advanced and, by a rotational movement of rotary rings 70, the face surfaces on the face sides 4, 6 of the container 2 and the sealing surfaces of the flanges 13 are cleaned. After cleaning has been performed, the cleaning brushes 72 are retracted, and the pressure rams 92 are actuated, which pressure rams push the closure plugs 10 into the container 2 until the sealing surface of the flange 13 sets down on the respective face surface of the hollow cylindrical container part 8. After the sealing plugs 10 have been pushed in, welding heads 74 are advanced and, by a rotational movement of the rotary ring 70, the closure plug 10 is welded to the hollow cylindrical container part 8 along an annular weld seam 40 (see FIG. 2). As an alternative to this, the closure plug 10 and container part 8 may also be brazed with one another along an annular brazed seam. Instead of a cohesive connection of this type, a shrink-fit connection may also be provided by virtue of the ends of the container 2 being inductively heated and the closure plugs 10 being pushed into the ends that have been expanded in this way. After the ends have cooled, the closure plug is fixed in fluid-tight fashion in the container part 8.

After the welding has been performed, the pressure rams 64 are retracted, the container 2 is received in a holder, and at least one of the processing chambers 50, 52 is axially displaced such that the container 2 can be withdrawn.

Figure 4A:
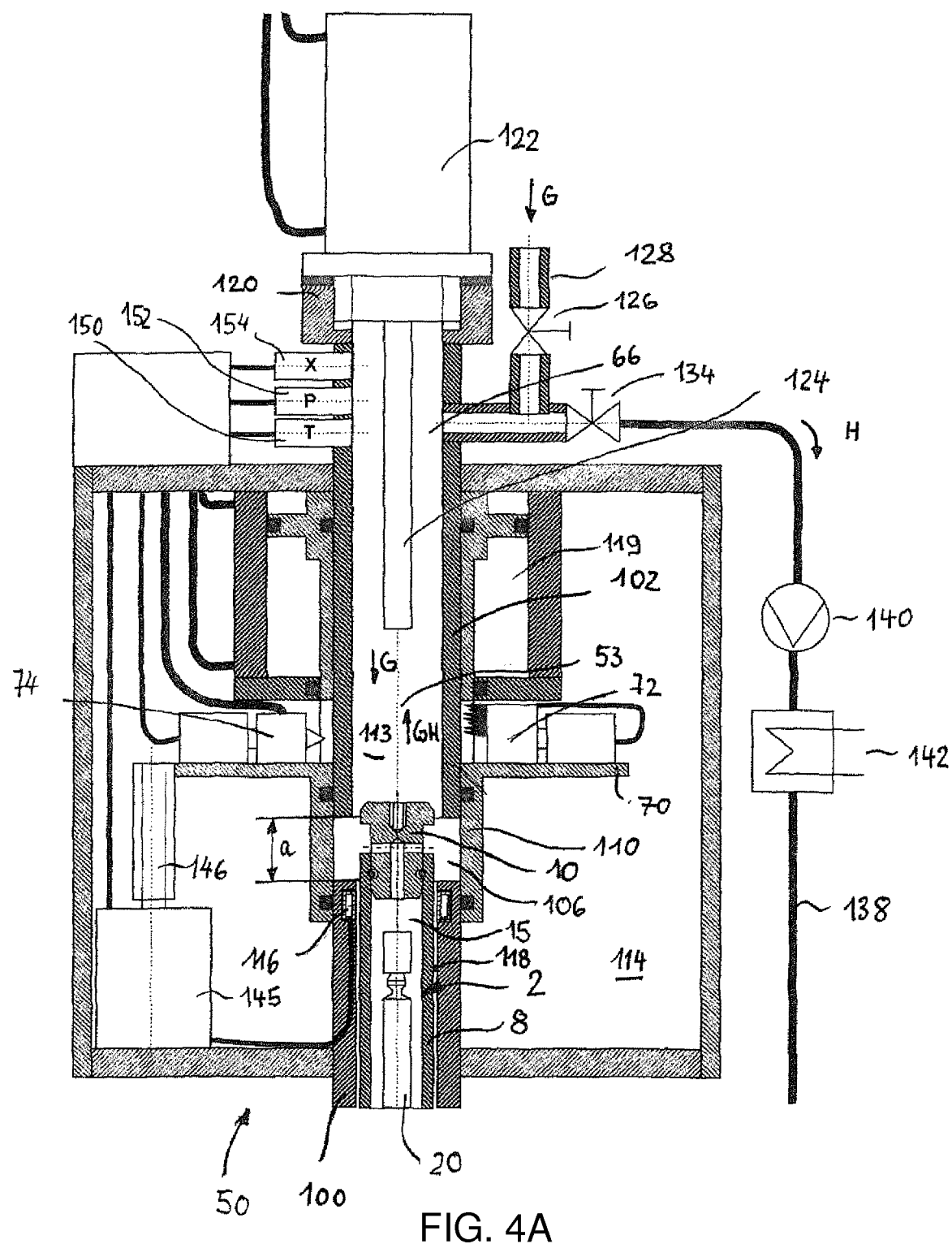
FIGS. 4A and 4b are diagrammatic, partial, longitudinal section views showing in each case mutually opposite processing chambers of an alternative embodiment of the device according to the invention, with the container mounted in a working position during the expulsion of water.
Figure 4B:
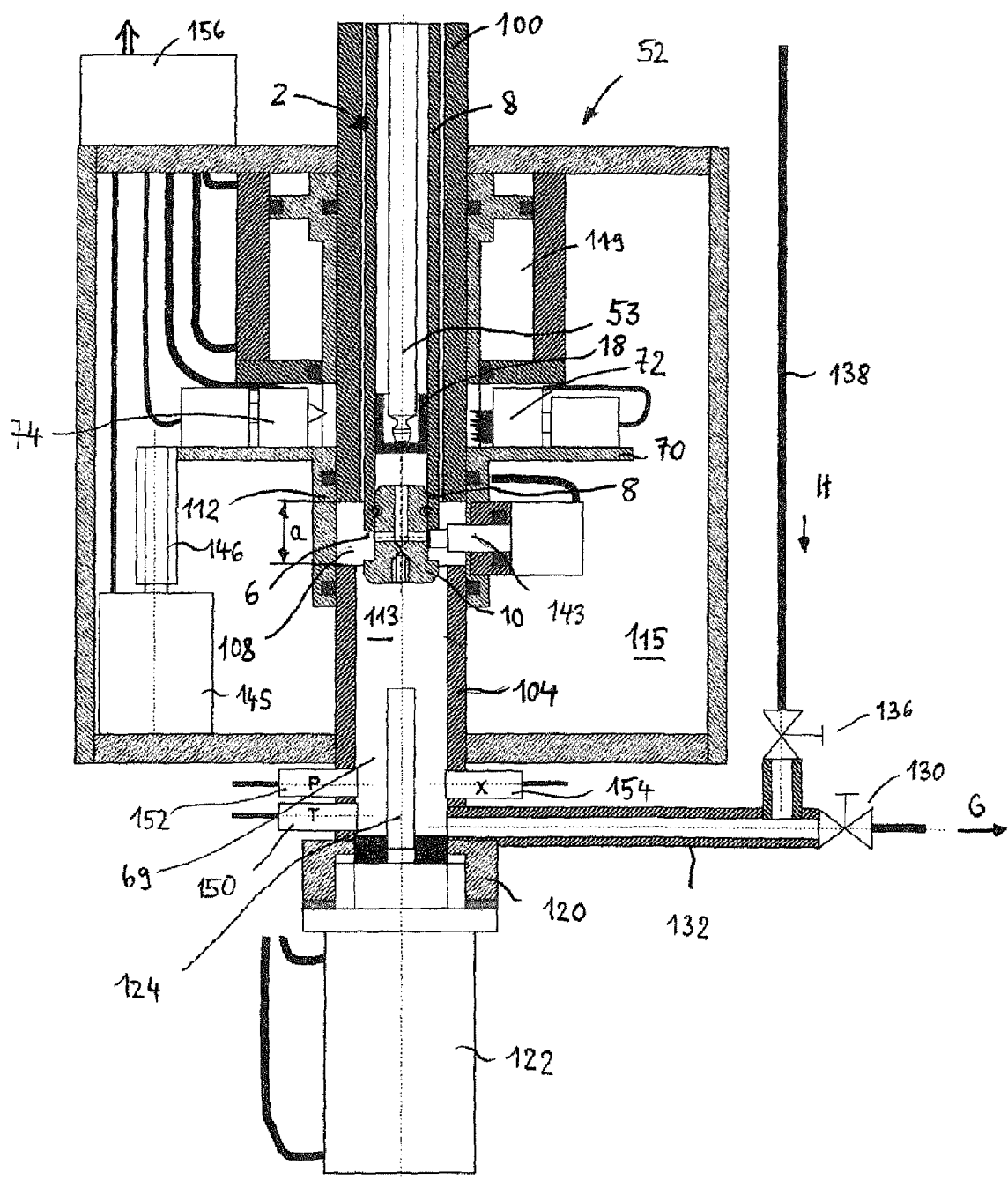

In the exemplary embodiment as per FIGS. 4A and 4B, the two processing chambers 50, 52 are connected to one another rigidly, and in fluid-tight fashion with respect to the outside, by a connecting pipe 100. The connecting pipe 100 projects by way of its face-side ends into the first and second processing chambers 50 and 52 respectively. The container 2 with its closure plugs 10 inserted in an intermediate position is inserted into the connecting pipe 100. In the intermediate position, the interior 15 of the container 2 is fluidically connected to the exterior. The cylindrical container part 8 of the container 2 projects beyond the connecting pipe 100 at both sides.

In the first and second processing chambers 50, 52, there are arranged an inlet pipe 102 and an outlet pipe 104 respectively, the central axes of which coincide with the system axis 53, and which form the inlet 66 and the outlet 69 for the scavenging gas G.

The connecting pipe 100 is arranged between the inlet pipe 102, which issues into the first processing chamber 50, and the outlet pipe 104, which issues into the second processing chamber 52, with an axial spacing a to each, such that, between the face sides facing toward one another, there remains a first and a second free space 106 and 108 respectively.

In the working position illustrated in FIGS. 4A and 4B, the inlet pipe 102 and connecting pipe 100, and the connecting pipe 100 and outlet pipe 104, are connected to one another in fluid-tight fashion by a first and a second sleeve 110 and 112 respectively, the sleeves being axially displaceable and mounted so as to be rotatable about the system axis 53, and form a rectilinear, relatively narrow scavenging chamber 113 which is fluidically separated from a first and a second working chamber 114, 115 respectively, in which the tools and drives required for the closure of the container 2 are situated, of the first and the second processing chamber 50, 52 respectively.

The connecting pipe 100 is provided, on its inner circumference at its face-side end projecting into the first processing chamber 50, with an adjustable seal element 116, in the example an inflatable sealing ring, by which, after the container 2 has been inserted into the connecting pipe 100, a gap chamber 118 situated between the container 2 and the connecting pipe 100 can be closed such that the scavenging gas G flowing in the scavenging chamber 113 flows exclusively through the container 2, and the inlet pipe and outlet pipe 102 and 104 respectively are fluidically connected to one another exclusively via the container 2. Owing to the connecting pipe 100 connected in fluid-tight fashion to the processing chambers 50, 52, it is adequate for the gap to be closed by a single sealing element 116 in order to achieve the desired guidance of the scavenging gas G through the container 2.

By a stroke-action cylinder 119 arranged in each of the first and second processing chambers 50, 52, it is possible for the first and second sleeve 110 and 112 respectively to be axially displaced such that the first and the second free space 106 and 108 respectively can be opened or closed with respect to the first and the second processing chamber 50, 52 respectively.

Those ends of the inlet pipe 102 and of the outlet pipe 104 which project out of the processing chambers 50, 52 are provided, in each case, with a connection piece 120 onto which there is sealingly mounted a stroke-action cylinder 122 which, like the stroke-action cylinder 91 in the exemplary embodiment of FIGS. 3A and 3B, drives a pressure ram 124 which is displaceable axially in the direction of the system axis 53 and by which the closure plugs 10 can be pushed into their final position.

A gas supply line 128 is connected via a valve 126 to the inlet pipe 102, via which gas supply line the scavenging gas G can be introduced at high pressure into the inlet pipe 102 in order to expel the water situated in the container 2. The water emerging into the outlet pipe 104 is then discharged via a water expulsion line 132 that can be closed off by a valve 130.

The inlet pipe 102 and outlet pipe 104 are connected via two-way valves 134 and 136 to a bypass line 138 which connects the inlet pipe 102 and outlet pipe 104 to one another in a closed gas circuit. In the bypass line 138 there are arranged a pump 140 and a heating device 142 by which a heating gas H situated in the bypass line 138 can be pumped through the inlet pipe 102, the container 2 and the outlet pipe 104 in order thereby to dry the fuel rod 20 situated in the container 2. During the drying process, the valves 126 and 130 are closed.

For the precise positioning of the container 2, the second sleeve 112 is provided with a radially extendable stop element 143, on which the container part 8 is seated by way of its lower face side 6.

The first and second sleeves 110, 112 are provided in each case with an annularly encircling flange which serves as a support for the welding head 74 and the cleaning brush 72 and which is simultaneously configured as a rotary ring 70 which meshes with a pinion 146 driven by a motor 145, such that the cleaning brush 72 and welding head 74 can be rotated about the system axis 53.

By use of temperature sensors 150, pressure sensors 152 and moisture sensors 154, the temperature T, the pressure P and the humidity X in the inlet pipe 102 and in the outlet pipe 104 are measured in order to be able to detect the progression of the drying process. The drying process is ended when the moisture content in the heating gas H attains a final value at which the moisture content rises no further and there is accordingly no longer any liquid water situated in the gas circuit. For a known volume of the container 2, it is possible for the absolute amount of water situated within the container 2 in the gaseous phase to be determined, and for adherence to specifications with regard to the maximum admissible water content to be reliably monitored. To achieve complete evaporation of the water, the volume of the gas circuit is several times greater than the volume of the hollow chamber situated in the container 2 when a fuel rod 20 has been inserted therein.

The mode of operation of the device during the encapsulation of a defective fuel rods 20 provided with openings in the region of its ends will be explained in more detail below.

Firstly, the device is opened. For this purpose, the upper stroke-action cylinder 122 arranged on the inlet pipe 102 is dismounted from the device. Before the dismounting process, the first and second sleeves 110 and 112 have been displaced into the position shown in FIGS. 4A and 4B, in which they produce a fluid-tight connection between the inlet pipe 102 and the connecting pipe 100 and between the connecting pipe 100 and the outlet pipe 104, such that the water that infiltrates, as a result of the dismounting of the, into the scavenging chamber 113 formed from the inlet pipe 102, connecting pipe 100 and outlet pipe 104 cannot pass into the processing chambers 50, 52.

Furthermore, the working chamber 114, which surrounds the scavenging chamber 113, of the processing chambers 50, 52 is permanently charged with scavenging gas (not illustrated) in order to thereby additionally prevents the infiltration of water.

The container 2 loaded with the fuel rod 20 is subsequently inserted, by a handling tool not illustrated in FIG. 4A, into the connecting pipe 100 until the container sets down on the extended stop element 143.

Thereafter, the stroke-action cylinder 122 is mounted in fluid-tight fashion onto the connection piece 120 again. The processes explained below take place with the device in a working position as illustrated in FIGS. 4A and 4B. After the stroke-action cylinder has been mounted, scavenging gas G is, by virtue of the valve 126 being opened, introduced at high pressure into the inlet pipe 102 and forced through the interior, and with a valve 136 open, the water situated in the scavenging chamber 113 is initially expelled.

Through subsequent pressurization of the inflatable seal 116 with a compressed gas, the gap between the connecting pipe 100 and container part 8 is closed, such that the scavenging gas G flows exclusively through the container 2, with water being expelled from the latter in this way. During the process, via openings that may have previously been provided on the top and bottom ends of the fuel rod 20 (not illustrated), water is also removed from the fuel rod 20. The gas flow is maintained until the humidity X measured by the humidity sensor 154 arranged on the outlet pipe 104 falls below a predefined threshold value and signals an adequate level of dryness. Subsequently, any water still situated in the bypass line 138 is expelled by virtue of the valve 136 being opened and the pump 140 being set in operation. The valves 128 and 130 are subsequently closed.

Subsequently, for the purpose of drying the fuel rod 20, the heating device 140 is set in operation. The pump 140 drives the scavenging gas G, which is situated in the scavenging chamber 113, via the heating device 142. In the heating device 142, the scavenging gas G is heated and passes, as heating gas H, via the thermally insulated water expulsion line 132 to the scavenging chamber 113 and to the lower closure plug 10 of the container 2. From here, the heating gas H passes into the interior of the container 2 and to the filter element 18. By virtue of the heating gas H being conducted in this direction, residual water is blown out of the filter element 18, such that the heating gas H can pass through more easily. By the heating gas H flowing along the fuel rod 20, the water situated therein in the fuel matrix is evaporated, is released into the container 2 via the openings provided previously on the top and bottom ends of the fuel rod 20, and is transported with the heating gas H into the scavenging chamber 113 via the upper closure plug 10. From there, the moisture-laden heating gas H is supplied via the valve 134 back to the pump 140. The gas circuit is thus closed. The temperature T of the heating gas H is detected by the temperature sensors 150 and is fed, via a distributor 156, to an evaluation and control unit which is not illustrated in the figures and which controls the pump 140 and heating device 142 and regulates the temperature T to a predefined target value. The evaluation and control unit also controls the other active components in the device—valves, pump, processing devices, stroke-action cylinder, motor drives etc.

The passage of the heating gas H in the container 2 is monitored by the pressure sensors 152. The heating gas H is circulated in the gas circuit until the upper and lower humidity sensors 154 register adequate saturation. This is an indication that all of the water in the fuel matrix has evaporated and no further water is being released. At this point, the heating and circulation of the heating gas H can be terminated. By opening the valve 126, fresh scavenging gas G can flow in. By cyclically opening and closing the valve 130, the scavenging gas G is alternately discharged via the water expulsion line 132 or conducted through the container 2. Finally, the valves 130, 134, 136 are closed and pressure equalization between the scavenging chamber 113 and working chamber 114, 115 of the processing chambers 50, 52 is performed. The valve 126 is subsequently closed.

Thereafter, the first sleeve 110 is pushed onto the connecting pipe 100 by the stroke-action cylinder 122, such that the free space 106 is open to the interior of the first processing chamber, and the brush 72 and welding head 74 situated at the level of the face side 4 of the container part 8. Following the actuation of the brush advancement, that is to say the application of the brush 72 to the contact surfaces to be cleaned, the first sleeve 110 is set in rotation, and thus the brush 72 is also moved around the container 2, by virtue of the pinion 146 being driven. After the cleaning process, the brush 72 is retracted into the initial position again.

Figure 5A:
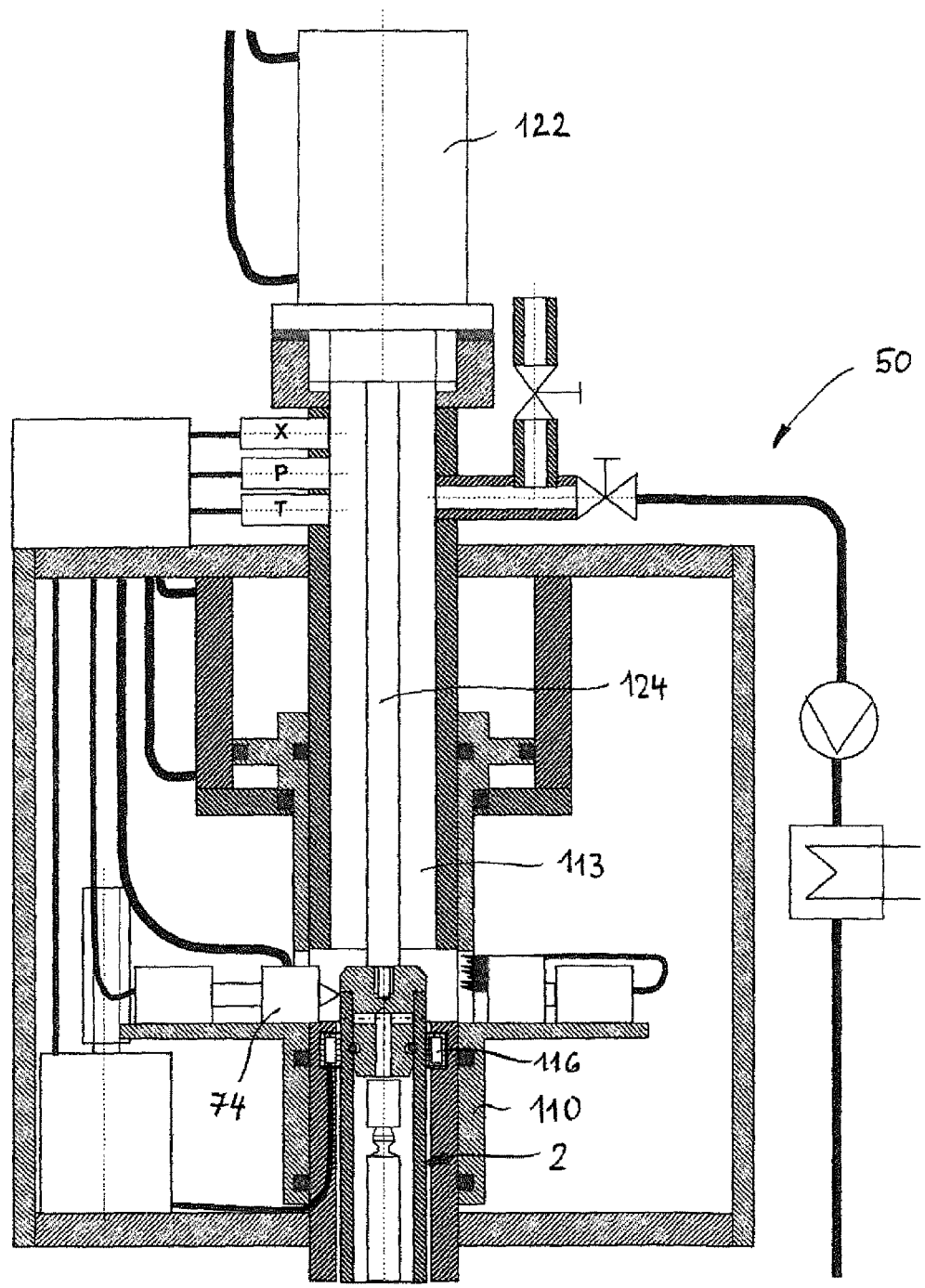
FIGS. 5A and 5b are diagrammatic, partial, longitudinal section views showing the processing chambers in the working position assumed after the expulsion of water and drying have taken place and during a welding process.

Subsequently, the stroke-action cylinder 122 is actuated, and, by the piston rod thereof, the upper closure plug 10 is pushed onto the container part 8. Thereafter, the welding head 74 is advanced radially and moved around the container 2 by rotation of the first sleeve 110. The working position is illustrated in FIG. 5A. After the welding process, the upper welding head 74 is also moved into the initial position again, and the sleeve 110 is also moved into the initial position again.

Figure 5B:
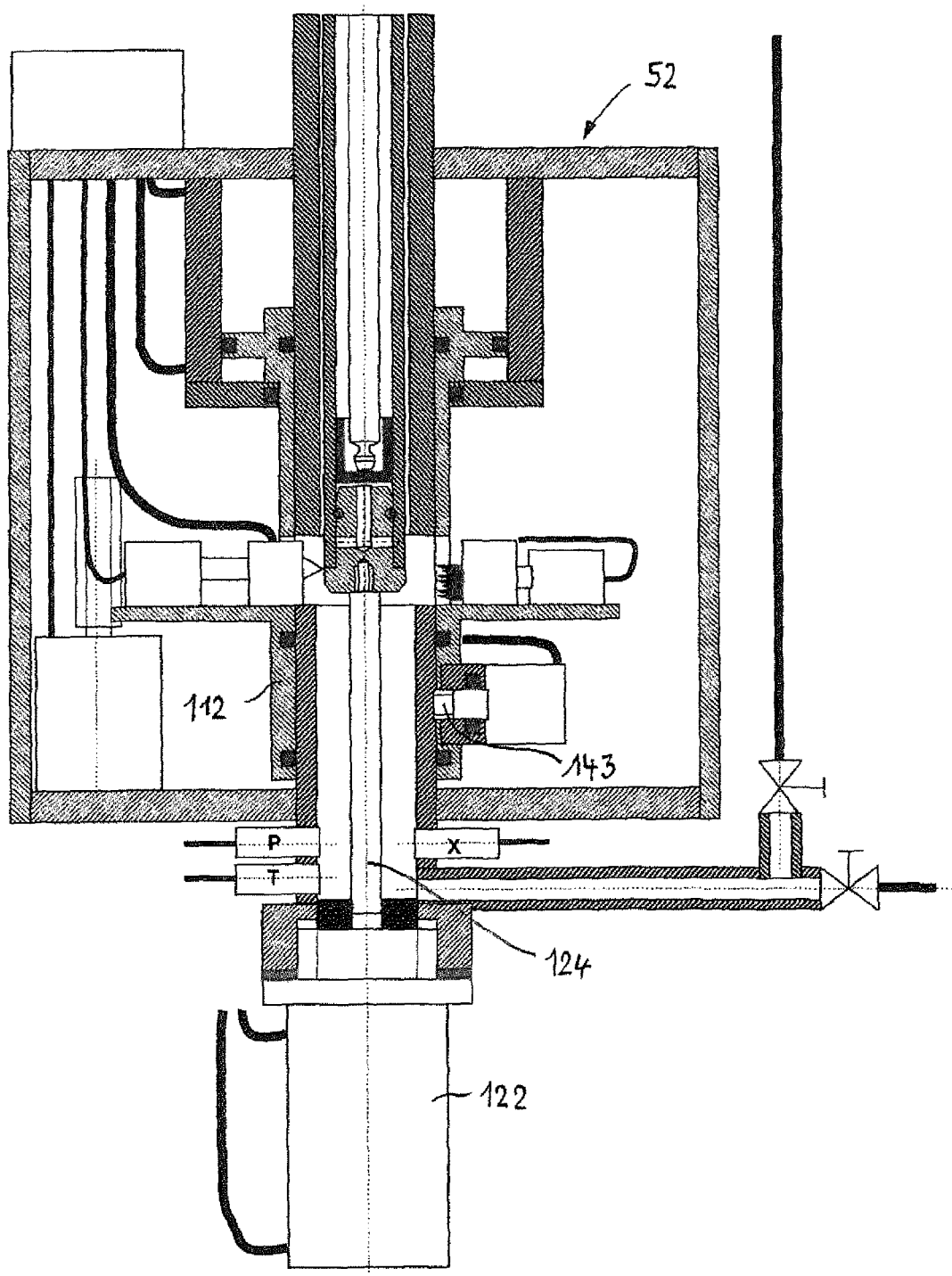

The cleaning and welding in the second processing chamber 52 subsequently takes place analogously, wherein, before the displacement of the second sleeve 112 into the position required for the cleaning and welding processes, the stop element 143 is retracted. FIG. 5B likewise shows a situation in which the welding head 74 is situated in a working position.

For the withdrawal of the closed container 2, the device is opened. For this purpose, the pressure ram 124 of the upper stroke-action cylinder 122 is retracted and is thereafter dismounted from the device. As a result of the dismounting process, the scavenging chamber 113 of the device is flooded with water. The container 2 is then gripped by a bar-type tool, the inflatable sealing element 116 is ventilated, and the pressure ram 124 of the lower stroke-action cylinder 122 is moved into the initial position again.

The drying process illustrated in conjunction with FIGS. 4A, 4B, 5A, and 5B may basically also be performed in the case of the device illustrated in FIGS. 3A and 3B by virtue of the device being supplemented by the heating circuit illustrated in FIGS. 4A, 4B, 5A and 5B.

The invention claimed is:

1. A container for a gas-tight encapsulation of a fuel rod or of a fuel rod section, the container comprising:
   unipartite closure plugs each having a duct formed therein; and
   a hollow cylindrical container part having two free ends closed off in a fluid-tight manner by said unipartite closure plugs, said hollow cylindrical container part having a scavenging chamber fluidly connected to an exterior via said duct exclusively in an intermediate position assumed during an assembly process before an end position is reached and in the intermediate position said unipartite closure plugs projecting out of said hollow cylindrical container part by an axial projecting length in relation to an end position of said unipartite closure plugs.

2. The container according to claim 1, wherein said duct has a first duct section which runs parallel to a longitudinal central axis of said unipartite closure plug from an inner face side of said unipartite closure plug and issues into a second duct section, said second duct section running transversely with respect to said longitudinal central axis and extending from a shell surface of said unipartite closure plug.

3. The container according to claim 1, wherein said unipartite closure plugs and/or said hollow cylindrical container part are equipped, on an outer circumference and/or on an inner circumference, respectively, with detent devices which serve for detachably fixing said unipartite closure plug in the intermediate position.

4. The container according to claim 3, wherein each of said unipartite closure plugs has an annularly encircling flange, and in a fully assembled position, each of said unipartite closure plugs is seated by way of said annularly encircling flange on a face surface of said hollow cylindrical container part.

5. The container according to claim 4, further comprising an annularly encircling seam selected from the group consisting for weld seams and brazed seams, said annularly encircling flange and said face surface are connected to one another in a cohesive manner by said annularly encircling seam.

6. The container according to claim 3, wherein said unipartite closure plugs are fixed in a fluid-tight fashion in said hollow cylindrical container part by means of a shrink-fit connection.

7. A device for a gas-tight encapsulation of a fuel rod or a fuel rod section in a container, the device comprising:
   a first processing chamber having a first opening formed therein;
   a second processing chamber having a second opening formed therein;
   said first and second processing chambers disposed spaced apart from one another and on a common system axis;
   said first and second openings each receiving a respective free end of the container issuing into said first and second processing chambers, such that said first and second processing chambers, when the container is disposed between them, can be fluidically connected to one another exclusively via the container itself;
   said first processing chamber having an inlet and said second processing chamber having an outlet for a scavenging gas; and
   each of said first and second processing chambers having means for closing the container in a gas-tight manner.

8. The device according to claim 7, wherein said first and second processing chambers are disposed so as to be displaceable along the common system axis.

9. The device according to claim 7,
   further comprising sealing rings for sealing said first and second openings; and
   wherein each of said first and second processing chambers has a pressure ram which annularly surrounds said first or second opening and which can be advanced in a direction of the common system axis toward said first or second opening and by means of which, by way of an advancing movement in the direction of the common system axis, a force with a component acting transversely with respect thereto is exerted on said sealing rings disposed on said first or second opening and which surrounds said first or second opening.

10. The device according to claim 7, further comprising a connecting pipe for rigidly connecting said first and second processing chambers to one another along the common system axis, said connecting pipe having face-side ends and projecting by way of said face-side ends into said first and second processing chambers and into which the container can be inserted such that the container projects by way of free ends beyond said connecting pipe.

11. The device according to claim 10,
   wherein said inlet is formed by an inlet pipe;
   wherein said outlet is formed by an outlet pipe, said inlet pipe and said outlet pipe issue into said first and second processing chambers respectively and a central axes of said inlet pipe and said outlet pipe coincide with the common system axis and between said inlet pipe and said outlet pipe, said connecting pipe is disposed in each case with an axial spacing, such that, between face sides facing toward one another, there remain a first and a second free space respectively; and
   further comprising first and second sleeves, said connecting pipe connected in fluid-tight fashion to said inlet pipe and to said outlet pipe by means of said first and second sleeves, respectively, which is disposed so as to be axially displaceable into a first position, and wherein said first and second sleeves are displaceable into a second position in which the first and second free spaces are open to said first and second processing chambers respectively.

12. The device according to claim 11, further comprising at least one sealing element disposed between the container and said connecting pipe, said at least one sealing element can be set such that said first and second processing chambers are fluidically connected to one another exclusively via the container.

13. The device according to claim 7, further comprising:
   a pump;
   a heating device; and
   a bypass line connecting said inlet to said outlet, said bypass line running outside said first and second processing chambers, in such a way that a closed gas circuit is formed, wherein, in said closed gas circuit, there are disposed said pump and said heating device for respectively circulating and heating a heating gas situated in said closed gas circuit.

14. The device according to claim 7, wherein each of said first and second processing chambers has a pressure ram for exerting a pressure force that acts in the direction of the common system axis.

15. The device according to claim 11, wherein each of said first and second processing chambers has a welding head which is mounted such that said welding head can be rotated about, and advanced toward, the common system axis.

16. The device according to claim 15, further comprising a cleaning brush disposed in each of said first and second processing chambers, said cleaning brush mounted so as to be rotatable about, and advanced toward, the common system axis.

17. The device according to claim 16, further comprising a common rotary ring, said welding head and said cleaning brush disposed on said common rotary ring.

18. The device according to claim 17, wherein said common rotary ring is formed by an annularly encircling flange disposed on each of said first and second sleeves.

19. A method for gas-tight encapsulation of a fuel rod or a fuel rod section in a container by means of a device, the container including unipartite closure plugs each having a duct, and a hollow cylindrical container part having two free ends closed off in a fluid-tight manner by said unipartite closure plugs, the hollow cylindrical container part having a scavenging chamber fluidly connected to an exterior via the duct exclusively in an intermediate position assumed during an assembly process before an end position is reached and in the intermediate position the unipartite closure plugs projecting out of the container part by an axial projecting length in relation to an end position of the unipartite closure plugs, the device containing:
   a first processing chamber having a first opening formed therein;
   a second processing chamber having a second opening formed therein;
   the first and second processing chambers disposed spaced apart from one another and on a common system axis;
   the first and second openings each receiving a free end of the container issuing into the first and second processing chambers, such that the first and second processing chambers, when the container is disposed between them, can be fluidically connected to one another exclusively via the container itself;

the first processing chamber having an inlet and said second processing chamber having an outlet for a scavenging gas; and each of the first and second processing chambers having means for closing the container in gas-tight fashion, which method comprises the steps of:

introducing a free end of the container part, equipped with a unipartite closure plug in the intermediate position and which contains the fuel rod or the fuel rod section, through the first opening into the first processing chamber;

introducing an opposite free end through the second opening into the second processing chamber, such that the first and second processing chambers are fluidically connected to one another exclusively via the container part itself; and injecting the scavenging gas into the container part and expelling water situated in the container part through a build-up of a positive pressure.

20. The method according to claim 19, wherein after an expulsion of the water, pumping a heating gas through the container part.

21. The method according to claim 19, which further comprises:

subsequently, pressing the unipartite closure plug into the container part as far as an end position; and connecting the unipartite closure plug in a fluid-tight manner to the container part.

22. The method according to claim 19, which further comprises cohesively connecting the unipartite closure plug to the container part by means of an annularly encircling weld seam or brazed seam.

23. The method according to claim 19, which further comprises fixing the unipartite closure plug in a fluid-tight manner in the hollow cylindrical container part by means of a shrink-fit connection.

* * * * *